(12) United States Patent
Saito et al.

(10) Patent No.: US 12,481,830 B2
(45) Date of Patent: Nov. 25, 2025

(54) TEXT GENERATION APPARATUS, TEXT GENERATION LEARNING APPARATUS, TEXT GENERATION METHOD, TEXT GENERATION LEARNING METHOD AND PROGRAM

(71) Applicant: NTT, Inc., Tokyo (JP)

(72) Inventors: Itsumi Saito, Tokyo (JP); Kyosuke Nishida, Tokyo (JP); Atsushi Otsuka, Tokyo (JP); Kosuke Nishida, Tokyo (JP); Hisako Asano, Tokyo (JP); Junji Tomita, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 17/764,169

(22) PCT Filed: Oct. 2, 2019

(86) PCT No.: PCT/JP2019/038947
§ 371 (c)(1),
(2) Date: Mar. 26, 2022

(87) PCT Pub. No.: WO2021/064906
PCT Pub. Date: Apr. 8, 2021

(65) Prior Publication Data
US 2022/0343076 A1 Oct. 27, 2022

(51) Int. Cl.
*G06F 40/289* (2020.01)
(52) U.S. Cl.
CPC .................. *G06F 40/289* (2020.01)

(58) Field of Classification Search
CPC ...... G06F 16/345; G06F 40/56; G06F 40/289; G06F 40/216
See application file for complete search history.

(56) References Cited

U.S. PATENT DOCUMENTS

| 6,205,456 B1 * | 3/2001 | Nakao ................... G06F 16/345 715/201 |
| 2002/0052901 A1 * | 5/2002 | Guo ........................ G06F 40/20 707/E17.094 |
| 2002/0078090 A1 * | 6/2002 | Hwang .................. G06F 16/353 715/201 |

(Continued)

FOREIGN PATENT DOCUMENTS

| JP | 2019-040574 A | 3/2019 |
| JP | 2019121139 A | 7/2019 |

OTHER PUBLICATIONS

See et al, "Get to the Point: Summarization with Pointer-Generator Networks", published: Apr. 2017, publisher: arXiv, pp. 1-20 (Year: 2017).*

(Continued)

*Primary Examiner* — Wilson W Tsui

(57) ABSTRACT

A text generation apparatus includes a memory and a processor configured to, based on learned parameters of neural networks, acquire, as a reference text, a predetermined number of two or more sentences having a relatively high relevance to an input sentence from a set of sentences different from the input sentence and generate text based on the input sentence and the reference text, such that information to be considered when generating text can be added as text.

6 Claims, 15 Drawing Sheets

(56) References Cited

U.S. PATENT DOCUMENTS

| | | | |
|---|---|---|---|
| 2003/0233224 A1* | 12/2003 | Marchisio | G06F 16/3344 |
| | | | 707/E17.084 |
| 2004/0117740 A1* | 6/2004 | Chen | 715/210 |
| 2005/0222973 A1* | 10/2005 | Kaiser | G06F 16/93 |
| 2006/0200464 A1* | 9/2006 | Gideoni | G06F 16/345 |
| 2019/0155877 A1* | 5/2019 | Sharma | G06F 40/151 |
| 2020/0159755 A1* | 5/2020 | Iida | G06N 3/0445 |
| 2020/0167391 A1* | 5/2020 | Zheng | G06F 16/3347 |
| 2020/0257757 A1* | 8/2020 | Chawla | G06F 40/30 |

OTHER PUBLICATIONS

Liu et al, "Hierarchical Transformers for Multi-Document Summarization", published: May 2019, publisher: arXiv, pp. 1-12 (Year: 2019).*

Niantao Xie et al, "Abstractive Summarization Improved by WordNet-Based Extractive Sentences", publisher: Springer, pp. 404-415 (Year: 2018).*

Hsu et al. (2018) "A Unified Model for Extractive and Abstractive Summarization using Inconsistency Loss".

Vaswani et al. (2017) "Attention is all you need" Advances in Neural Information Processing Systems 30, pp. 5998-6008.

Pennington et al. (2014) "Glove: Global vectors for word representation" EMNLP, 12 pages.

Srivastava et al. (2015) "Highway networks" CoRR, 1505.00387, 6 pages.

Saito et al. (2019) "Document summarization model that can take into consideration query/output length" 25th Annual Meeting of the association for natural language processing (NLP 2019) [online] website: https://www.anlp.jp/proceedings/annual_meeting/2019/pdf_dir/P2-11.pdf., 12 pages.

Gehrmann et al. (2018) "Bottom-up abstractive summarization" EMNLP, pp. 4098-4109.

Hsu et al. (2018) "A unified model for extractive and abstractive summarization using inconsistency loss" ACL (1), pp. 132-141.

Hermann et al. (2015) "Teaching machines to read and comprehend" Advances in Neural Information Processing Systems 28, pp. 1693-1701.

See et al. (2017) "Get to the point: Summarization with pointer-generator networks" ACL (1), pp. 1073-1083.

Grusky et al. (2018) "Newsroom: A dataset of 1.3 million summaries with diverse extractive strategies" Proceedings of the 2018 Conference of the North American Chapter of the Association for Computational Linguistics: Human Language Technologies, vol. 1 (Long Papers), pp. 708-719. Association for Computational Linguistics.

Devlin et al. (2018) "Bert: Pre-training of deep bidirectional Transformers for language understanding" CoRR, 16 pages.

Kingma et al. (2015) "Adam: A method for stochastic optimization" International Conference on Learning Representations (ICLR), 15 pages.

Kikuchi et al. (2016) "Controlling output length in neural encoder-decoders" Proceedings of the 2016 Conference on Empirical Methods in Natural Language Processing, pp. 1328-1338. Association for Computational Linguistics.

Xiong et al. (2017) "Dynamic Coattention Networks for Question Answering" Published as a conference paper at ICLR 2017, 13 pages.

Cao et al. (2018 "Retrieve, rerank and rewrite: Soft template based neural summarization" Proceedings of the 56th Annual Meeting of the Association for Computational Linguistics (vol. 1: Long Papers), pp. 152-161. Association for Computational Linguistics.

Japanese Patent Application No. 2021-550849, Office Action mailed May 23, 2023.

* cited by examiner

| NEWS ARTICLES | HEADLINE |
|---|---|
| Due to the influence of cold air in the sky, the atmospheric condition becomes unstable in the Kanto region and it rains ~ | There is a risk of extremely heavy rain accompanied by lightning locally in the Kanto region. |
| Make efforts to index employees' "motivation" and disclose them to investors and the like in Tokyo ~ | Calculate employees' "motivated deviation values" and provide them to investors and the like |
| American space shuttle "Columbia" disintegrated in the skies February 1 upon re-entry into the atmosphere, killing all seven crew members ~ | In-flight disintegration: What happened to space shuttle |

(2)

| HEADLINE |
|---|
| There is a risk of extremely heavy rain accompanied by lightning locally in the Kanto region. |
| Calculate employees' "motivated deviation values" and provide them to investors and the like |
| In-flight disintegration: What happened to space shuttle |

TEXT GENERATION APPARATUS, TEXT GENERATION LEARNING APPARATUS, TEXT GENERATION METHOD, TEXT GENERATION LEARNING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/038947, filed on 2 Oct. 2019, the disclosure of which is hereby incorporated herein by reference in its entirety.

TECHNICAL FIELD

The present invention relates to a text generation apparatus, a text generation learning apparatus, a text generation method, a text generation learning method, and a program.

BACKGROUND ART

Text generation techniques based on neural networks have advanced. Such a generation technique is a technique of receiving text as an input and generating a predetermined target sentence (for example, a summary) based on a pre-trained neural network model.

For example, NPL 1 proposes a method in which a word-level importance (attention) obtained by multiplying the importance of a sentence included in an input document and the importance of a word is reflected in text generation.

CITATION LIST

Non Patent Literature

NPL 1: Wan-Ting Hsu, Chieh-Kai Lin, Ming-Ying Lee, Kerui Min, Jing Tang, Min Sun. 2018. A Unified Model for Extractive and Abstractive Summarization using Inconsistency Loss.

SUMMARY OF THE INVENTION

Technical Problem

However, in NPL 1, information to be considered when generating text is given in the form of an importance score, a length embedding, or the like and cannot be given as text.

The present invention has been made in view of the above points and it is an object of the present invention to make it possible to add information, to be considered when generating text, as text.

Means for Solving the Problem

Thus, to achieve the object, a text generation apparatus includes a memory and a processor configured to, based on learned parameters of neural networks, acquire, as a reference text, a predetermined number of two or more sentences having a relatively high relevance to an input sentence from a set of sentences different from the input sentence and generate text based on the input sentence and the reference text.

Effects of the Invention

Information to be considered when generating text can be added as text.

BRIEF DESCRIPTION OF DRAWINGS

FIG. 12 is a diagram illustrating an exemplary configuration of a knowledge source database 20.

DESCRIPTION OF EMBODIMENTS

Figure 1:
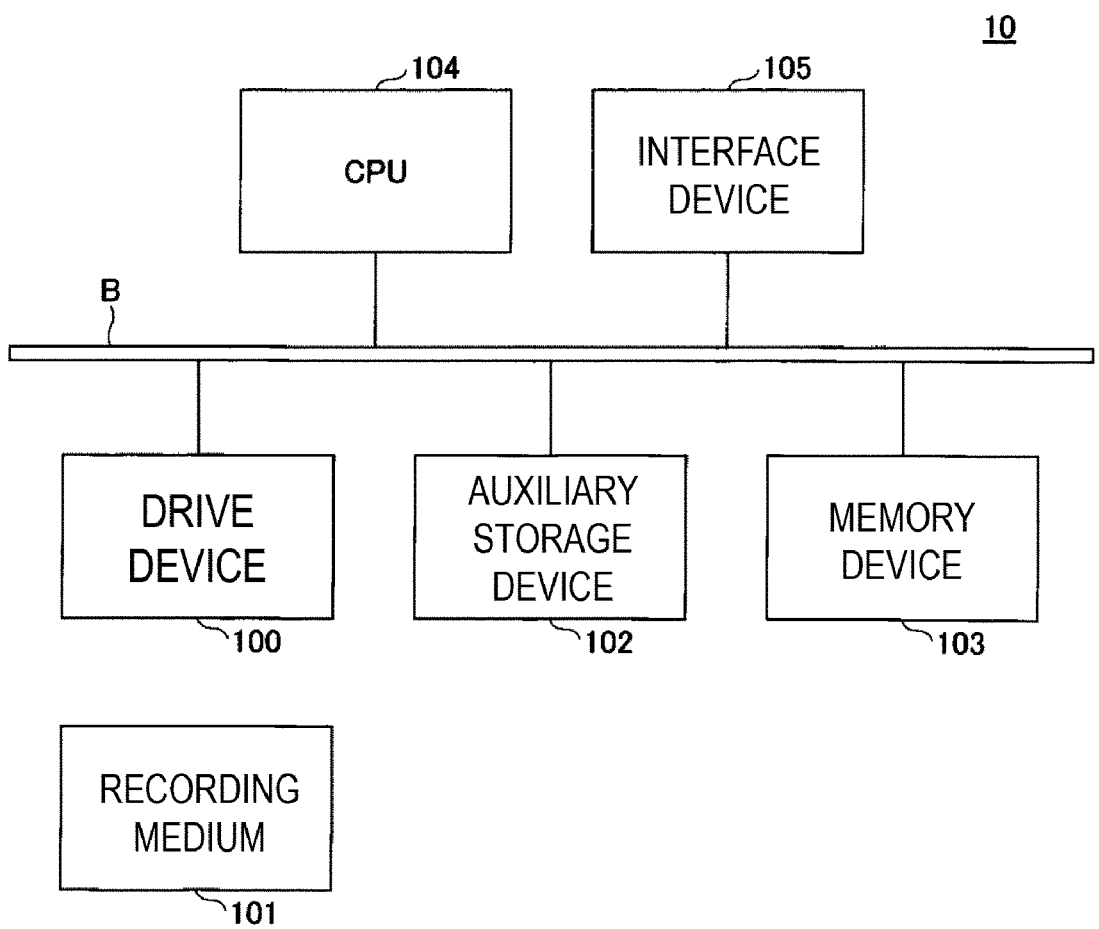
FIG. 1 is a diagram illustrating an exemplary hardware configuration of a text generation apparatus 10 according to a first embodiment.

Hereinafter, embodiments of the present invention will be described with reference to the drawings. FIG. 1 is a diagram illustrating an exemplary hardware configuration of a text generation apparatus 10 according to a first embodiment. The text generation apparatus 10 of FIG. 1 includes a drive device 100, an auxiliary storage device 102, a memory device 103, a CPU 104, an interface device 105, and the like which are connected to each other by a bus B.

A program that implements processing of the text generation apparatus 10 is provided through a recording medium 101 such as a CD-ROM. When the recording medium 101 storing the program is set in the drive device 100, the program is installed on the auxiliary storage device 102 from the recording medium 101 via the drive device 100. However, it is not always necessary to install the program from the recording medium 101 and the program may be downloaded from another computer via a network. The auxiliary storage device 102 stores the installed program and also stores necessary files, data, and the like.

The memory device 103 reads the program from the auxiliary storage device 102 and stores it upon receiving an instruction to activate the program. The CPU 104 executes a function relating to the text generation apparatus 10 according to the program stored in the memory device 103. The interface device 105 is used as an interface for connecting to a network.

Figure 2:
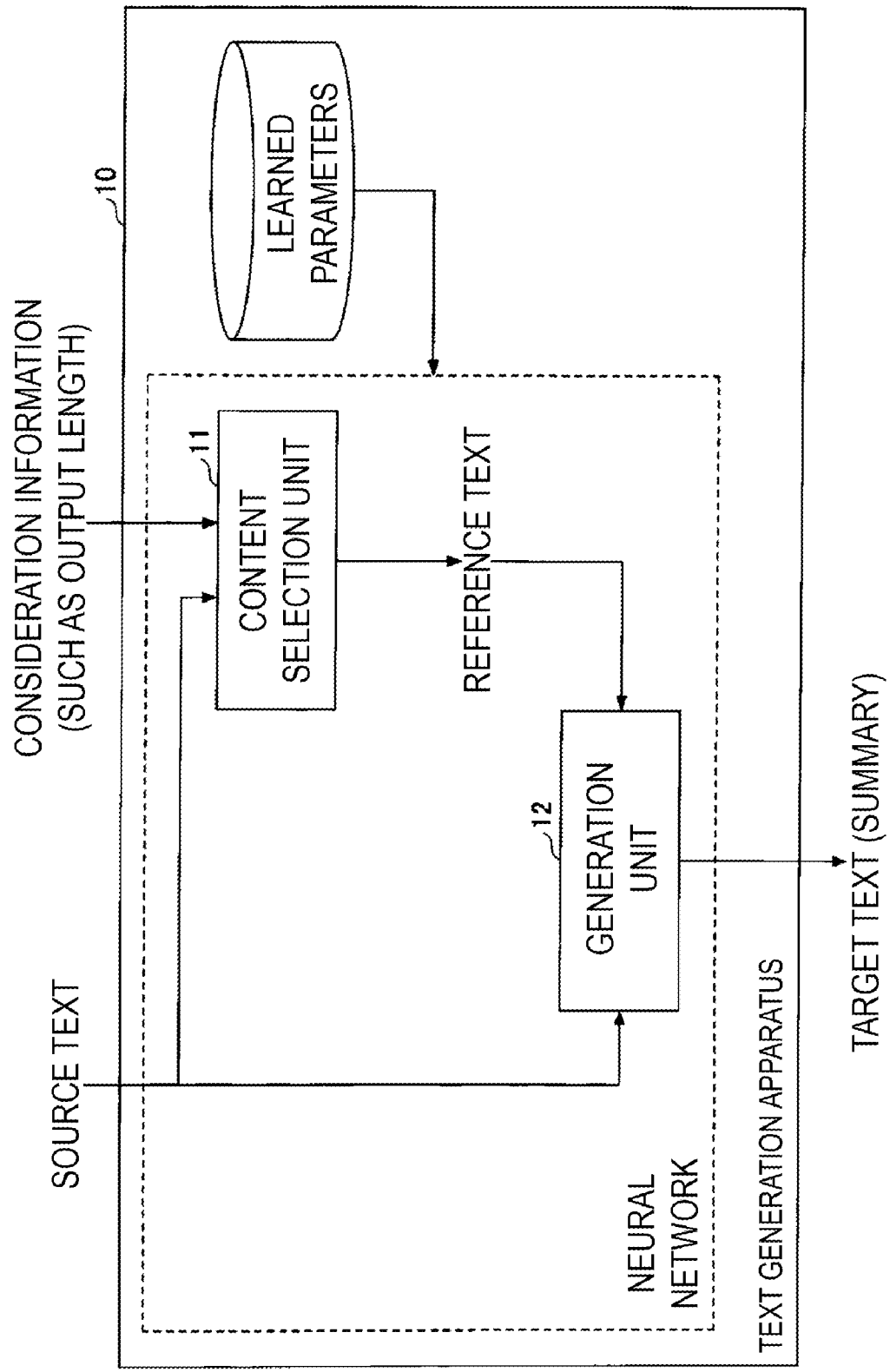
FIG. 2 is a diagram illustrating an exemplary functional configuration of the text generation apparatus 10 according to the first embodiment.

FIG. 2 is a diagram illustrating an exemplary functional configuration of the text generation apparatus 10 according to the first embodiment. In FIG. 2, the text generation apparatus 10 includes a content selection unit 11 and a generation unit 12. Each of these components is implemented by a process of causing the CPU 104 to execute one or more programs installed in the text generation apparatus 10.

A source text (an input sentence) and information different from the input sentence (a condition or information to be considered in summarizing the source text (hereinafter referred to as "consideration information")) are input to the text generation apparatus 10 as text. The first embodiment will be described with respect to an example in which the length (the number of words) K of a sentence (a summary) that the text generation apparatus 10 generates based on a source text (hereinafter referred to as an "output length K") is adopted as consideration information.

The content selection unit 11 estimates the importance [0, 1] of each word included in the source text. The content selection unit 11 extracts a predetermined number of words (up to a top k-th word in terms of importance) based on the output length K and outputs the result of concatenating the extracted words as a reference text. The importance is the probability of the word being included in a summary.

The generation unit 12 generates a target text (a summary) based on the source text and the reference text output from the content selection unit 11.

The content selection unit 11 and the generation unit 12 are based on neural networks that execute a text generation task (summarization in the present embodiment). Specifically, the content selection unit 11 is based on Bidirectional Encoder Representations from Transformers (BERT) and the generation unit 12 is based on a Transformer-based pointer generator model of "Ashish Vaswani, Noam Shazeer, Niki Parmar, Jakob Uszkoreit, Llion Jones, Aidan N Gomez, Lukasz Kaiser, and Illia Polosukhin. 2017. Attention is all you need. In Advances in Neural Information Processing Systems 30, pages 5998-6008" (hereinafter referred to as "Reference 1"). Thus, the content selection unit 11 and the generation unit 12 execute processing based on learned values of the training parameters (learned parameters) of the neural networks.

Figure 3:
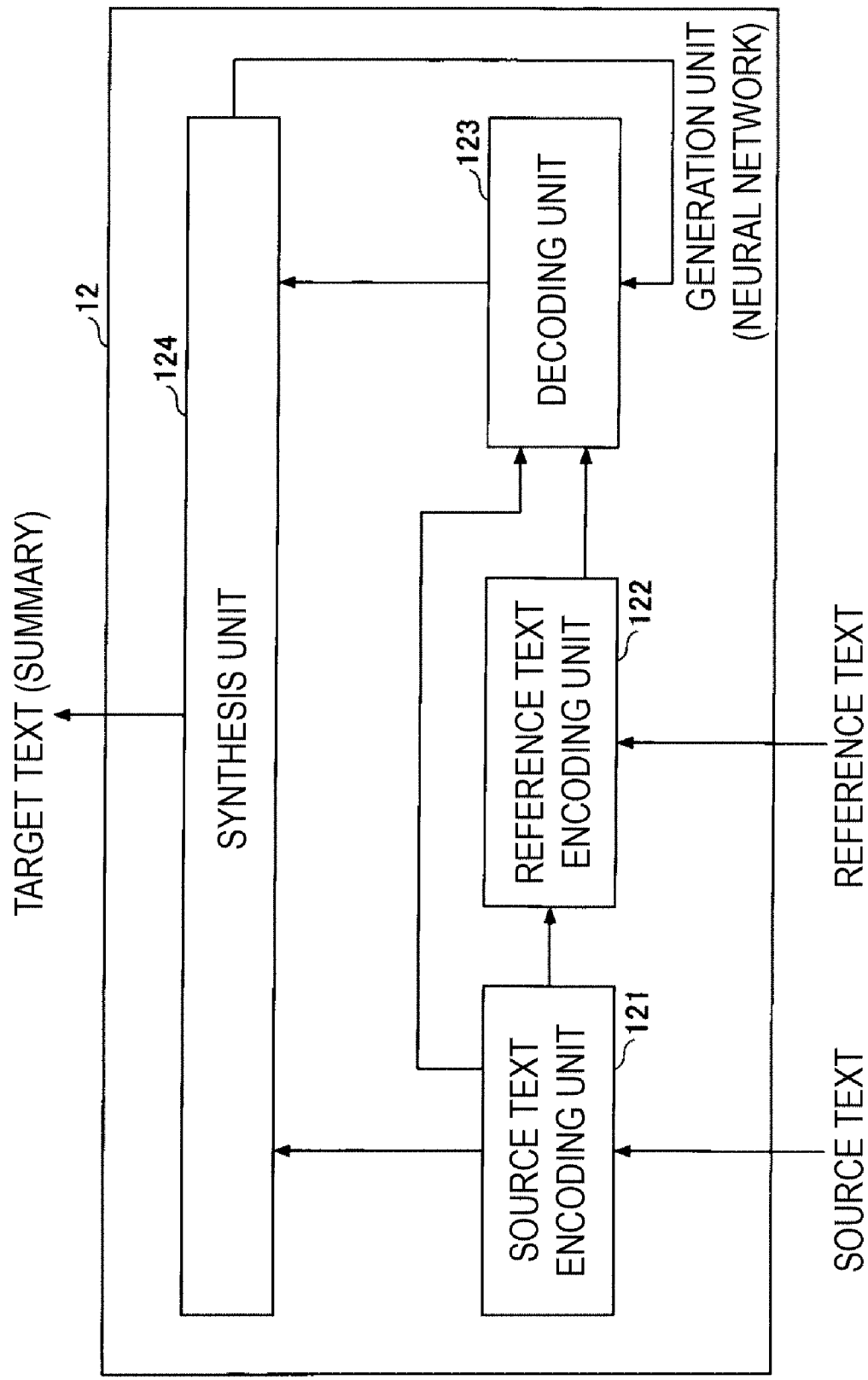
FIG. 3 is a diagram illustrating an exemplary configuration of a generation unit 12 in the first embodiment.

FIG. 3 is a diagram illustrating an exemplary configuration of the generation unit 12 in the first embodiment. As illustrated in FIG. 3, the generation unit 12 includes a source text encoding unit 121, a reference text encoding unit 122, a decoding unit 123, a synthesis unit 124, and the like. The function of each component will be described later.

Figure 4:
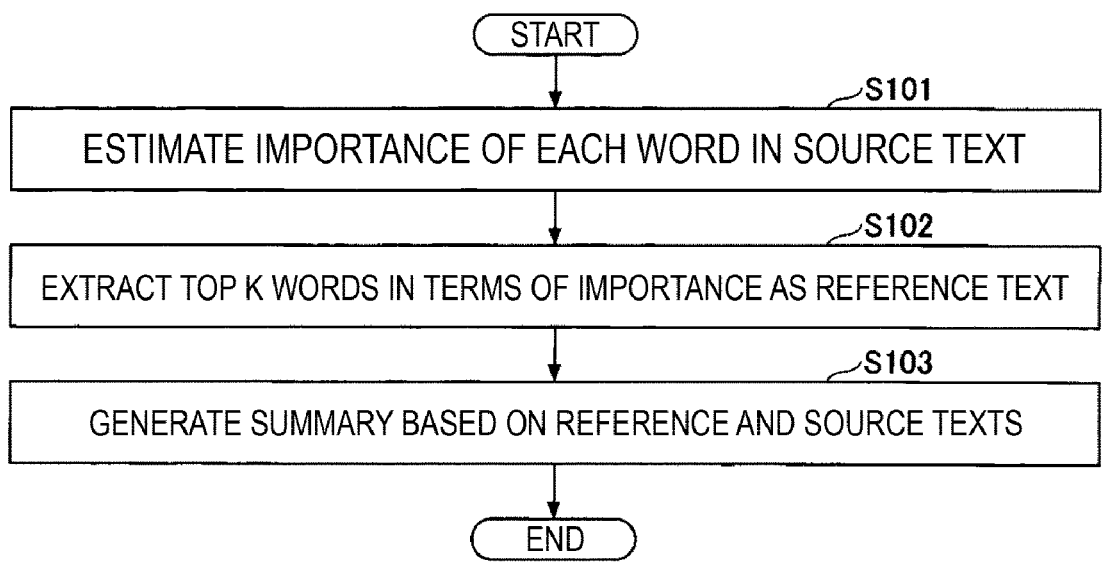
FIG. 4 is a flowchart for explaining an example of a processing procedure executed by the text generation apparatus 10 according to the first embodiment.

Hereinafter, a processing procedure executed by the text generation apparatus 10 will be described. FIG. 4 is a flowchart for explaining an example of the processing procedure executed by the text generation apparatus 10 in the first embodiment.

In step S101, the content selection unit 11 estimates (calculates) the importance of each word included in a source text $X^C$.

In the present embodiment, the content selection unit 11 uses Bidirectional Encoder Representations from Transformers (BERT). BERT has achieved the state-of-the-art (SOTA) in many sequence tagging tasks. In the present embodiment, the content selection unit 11 divides the source text into words using a BERT tokenizer, a fine-tuned BERT model, and a feed forward network added specifically for the task. The content selection unit 11 calculates the importance $p^{ext}_n$ of each word $x^C_n$ based on the following equation. $p^{ext}_n$ indicates the importance of an n-th word $x^C_n$ in the source text $X^C$.

[Math. 1]

$$p^{ext}_n = \sigma(W_1^\top \text{BERT}(X^C)_n + b_1) \quad (1)$$

where BERT( ) is the last hidden state of a pre-trained BERT.

[Math. 2]

$$W_1 \in \mathcal{R}^{d_{bert} \times 1}$$

And $b_1$ are training parameters of the content selection unit 11. σ is a sigmoid function. $d_{bert}$ is the dimensionality of the last hidden state of the pre-trained BERT.

Figure 5:
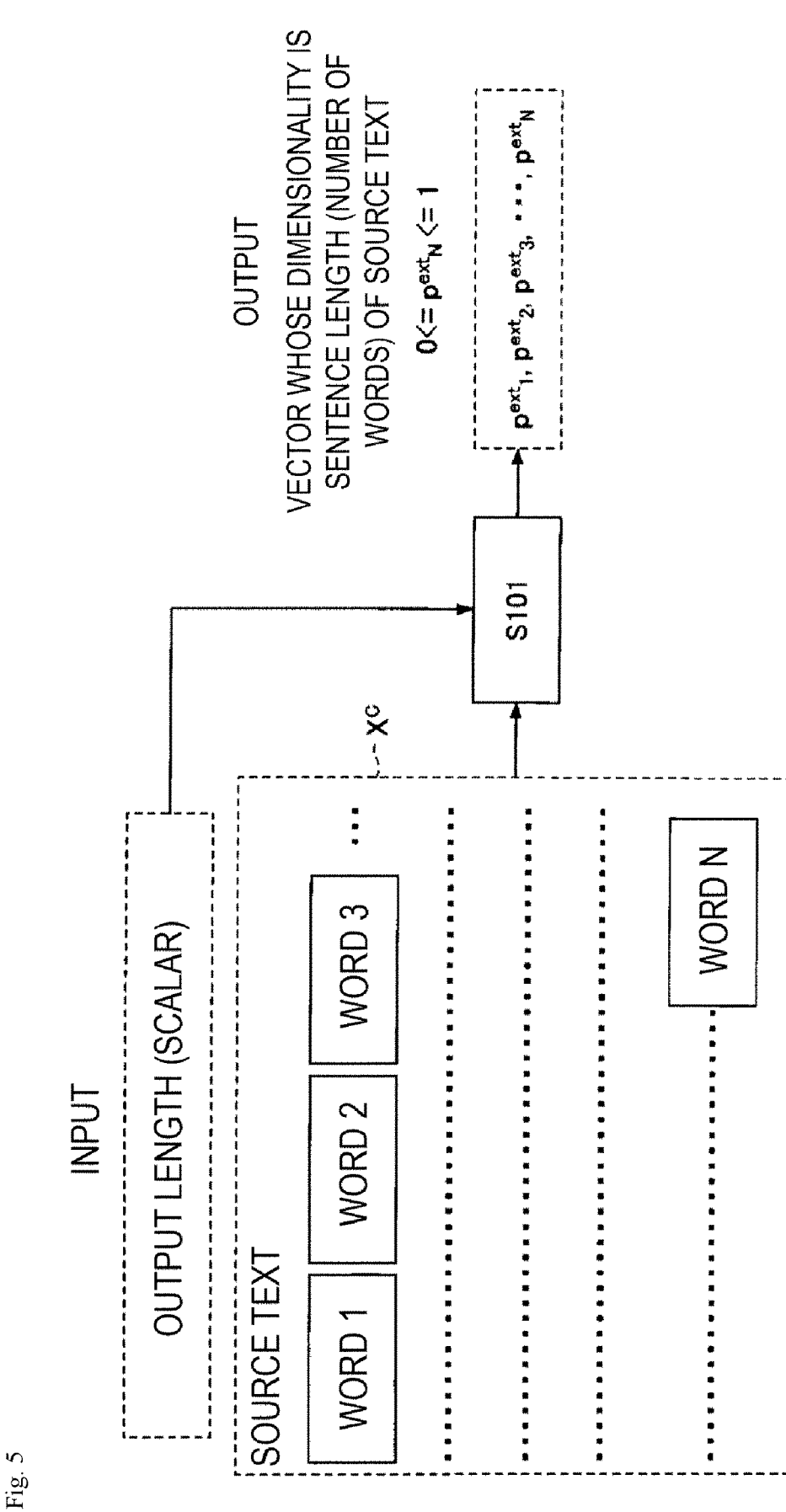
FIG. 5 is a diagram for explaining estimation of the importance of each word.

FIG. 5 is a diagram for explaining the estimation of the importance of each word. FIG. 5 illustrates an example in which the source text $X^C$ includes N words. In this case, the content selection unit 11 calculates the importance $p^{ext}_n$ of each of the N words.

Subsequently, the content selection unit 11 extracts a set (word sequence) of K words in order from a word with the highest importance $p^{ext}_n$ (S102). Here, K is the output length as described above. The extracted word sequence is output to the generation unit 12 as a reference text.

In step S101, the importance may be calculated as $p^{extw}_n$ of the following equation (2). In this case, a set (word sequence) of K words is extracted as a reference text in order from the word with the highest $p^{extw}_n$.

[Math. 3]

$$p^{extw}_n = p^{ext}_n \cdot p^{ext}_{S_j} \quad (2)$$

$$p^{ext}_{S_j} = \frac{1}{N_{S_j}} \sum_{l: x_n \in S_j} p^{ext}_n$$

Where $N_{S_j}$ is the number of words in a j-th sentence $S_j \in X^C$. By using this weighting, a sentence-level importance can be incorporated and a fluid reference text can be extracted as compared with the case in which only the word-level importance $p^{ext}_n$ is used.

According to the present embodiment, the length of a summary can be controlled according to the number of words in a reference text, regardless of whether equation (1) or equation (2) is used.

Subsequently, the generation unit 12 generates a summary based on the reference text and the source text $X^C$ (S103).

Figure 6:
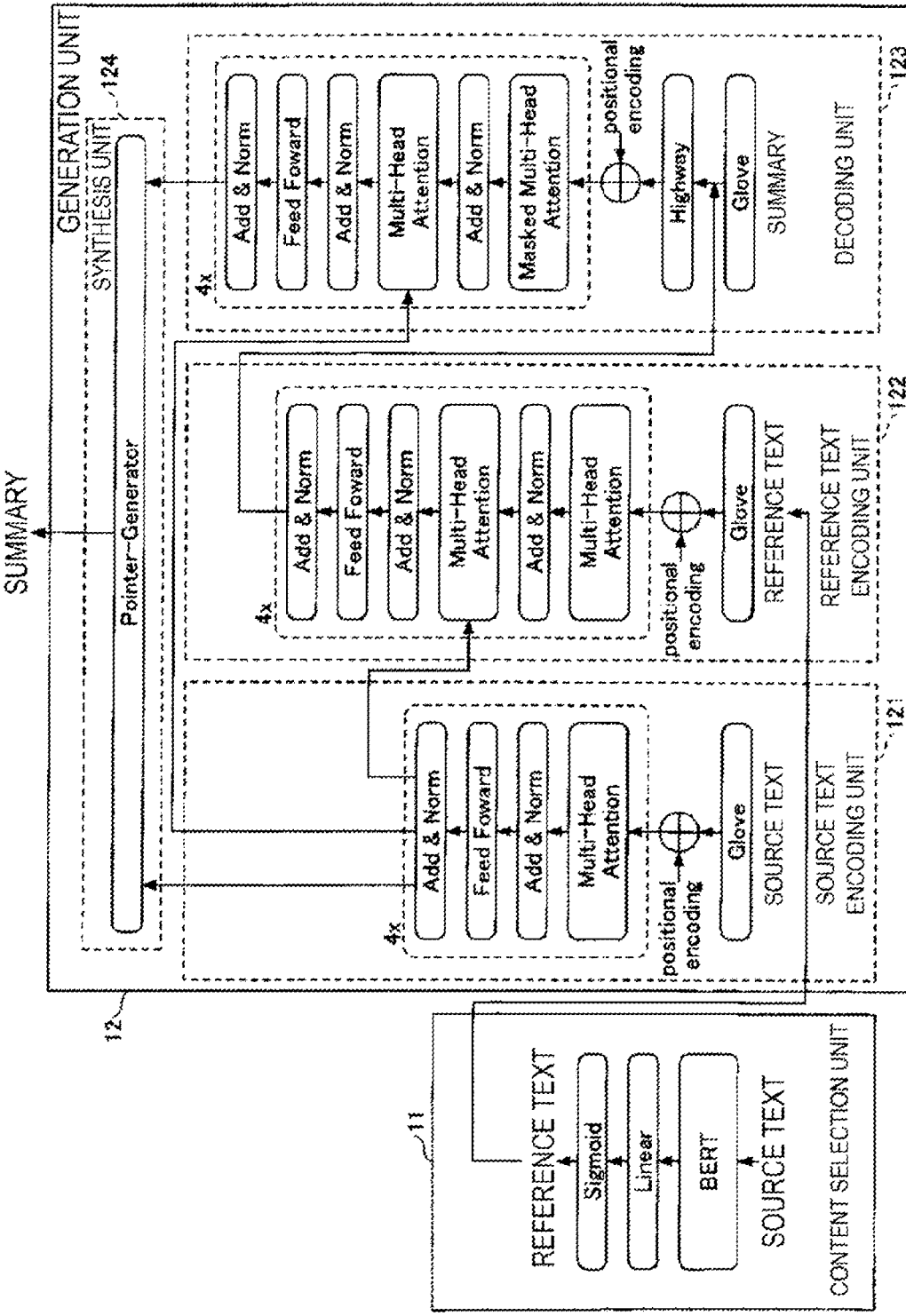
FIG. 6 is a diagram for explaining processing performed by the generation unit 12 in the first embodiment.

Details of step S103 will be described below. FIG. 6 is a diagram for explaining processing performed by the generation unit 12 in the first embodiment.

Source Text Encoding Unit 121 The source text encoding unit 121 receives the source text $X^C$ and outputs

[Math. 4]

$$M^C \in \mathcal{R}^{d_{model} \times V}$$

where $d_{model}$ is the model size of the Transformer.

An embedding layer of the source text encoding unit 121 projects one-hot vectors (of size V) of words $x^C_n$ onto a $d_{word}$-dimensional vector array using a pre-trained weight matrix

[Math. 5]

$$W^e \in \mathcal{R}^{d_{word} \times V}$$

such as that of Glove ("Jeffrey Pennington, Richard Socher, and Christopher D. Manning. 2014. Glove: Global vectors for word representation. In EMNLP" (hereinafter referred to as "Reference 2")).

The embedding layer then uses a fully connected layer to map each $d_{word}$-dimensional word embedding to a $d_{model}$-dimensional vector and passes the mapped embedding to a ReLU function. The embedding layer also adds positional encoding to the word embedding (Reference 1).

Each Transformer encoder block of the source text encoding unit 121 has the same architecture as that of Reference 1. Each Transformer encoder block includes a multi-head self-attention network and a fully connected feed forward network. Each network applies residual connections.

Reference Text Encoding Unit 122

The reference text encoding unit 122 receives a reference text $X^P$ which is a sequence of top K words in terms of importance. The words in the reference text $X^P$ are rearranged in the order of appearance in the source text. The output of the reference text encoding unit 122 is as follows.

[Math. 6]

$$M^P \in \mathcal{R}^{d_{model} \times K}$$

The embedding layer of the reference text encoding unit 122 is the same as the embedding layer of the source text encoding unit 121 except for the input.

Each Transformer decoder block of the reference text encoding unit 122 is almost the same as that of Reference 1. The reference text encoding unit 122 has an interactive alignment layer that performs multi-head attention at the output of the encoder stack in addition to two sub-layers of each encoder layer. Residual connections are applied in the same way as in the Transformer encoder block of the source text encoding unit 121.

Decoding Unit 123

The decoding unit 123 receives $M^P$ and the word sequence of a summary Y generated through an autoregressive process. Here, $M^P_t$ is used as a guide vector for generating the summary. The output of the decoding unit 123 is as follows.

[Math. 7]

$$M^S_t \in \mathcal{R}^{d_{model}}$$

where $t \in T$ is each decoding step.

An embedding layer of the decoding unit 123 uses a pre-trained weight matrix $W^e_t$ to map a t-th word $y_t$ in the summary Y to $M^y_t$. The embedding layer concatenates $M^y_t$ and $M^P_t$ and delivers the result to a highway network ("Rupesh Kumar Srivastava, Klaus Greff, and Jurgen Schmidhuber. 2015. Highway networks. CoRR, 1505.00387."). Thus, the concatenated embedding is as follows.

[Math. 8]

$$W^{merge}_t = \text{Highway}[M^y_t; M^P_t] \in \mathcal{R}^{d_{word} + d_{mode}}$$

$W^{merge}$ is mapped to a model-dimensional vector and passes through a ReLU as in the source text encoding unit 121 and the reference text encoding unit 122. Positional encoding is added to the mapped vector.

Each Transformer decoder block of the decoding unit 123 has the same architecture as that of Reference 1. This component is used stepwise during testing, such that a subsequent mask is used.

Synthesis Unit 124

Using a pointer-generator, the synthesis unit 124 selects information from any of the source text and the decoding unit 123 based on copy distributions and generates a summary based on the selected information.

In the present embodiment, a first attention head of the decoding unit 123 is used as a copy distribution. Thus, a final vocabulary distribution is as follows.

[Math. 9]

$$p(y_t \mid y_{1:t-1}, x) = p(z_t = 1 \mid y_{1:t-1}, x) \times p(y_t \mid z_t = 1, y_{1:t-1}, x) + p(z_t = 0 \mid y_{1:t-1}, x) \times p(y_t \mid z_t = 0, y_{1:t-1}, x)$$

where the generation probability is defined as follows.

[Math. 10]

$$p(y_t \mid z_t = 0, y_{1:t-1}, x) = \text{softmax}(W_v(M^S_t + b))$$

where $W_u \in \mathcal{R}^{d_{model} \times V}$ $p(y_t|z_t=1, y_{1:t-1}, x)$ is a copy distribution. $p(z_t)$ is a copy probability representing a weight as to whether $y_t$ is copied from the source text. $p(z_t)$ is defined as follows.

[Math. 11]

$$p(z_t) = \text{sigmoid}(W_c(M^S_t + b))$$

where $W_c \in \mathcal{R}^{d_{model} \times 1}$

The estimation of the importance in step S101 of FIG. 4 may be realized using a method disclosed in "Tsumi Saito, Kyosuke Nishida, Atsushi Otsuka, Mitsutoshi Nishida, Hisako Asano, and Junji Tomita, 'Document summarization model that can take into consideration query/output length,' 25th Annual Meeting of the association for natural language processing (NLP 2019), https://www.anlp.jp/proceedings/annual_meeting/2019/pdf_dir/P2-11.pdf."

Figure 7:
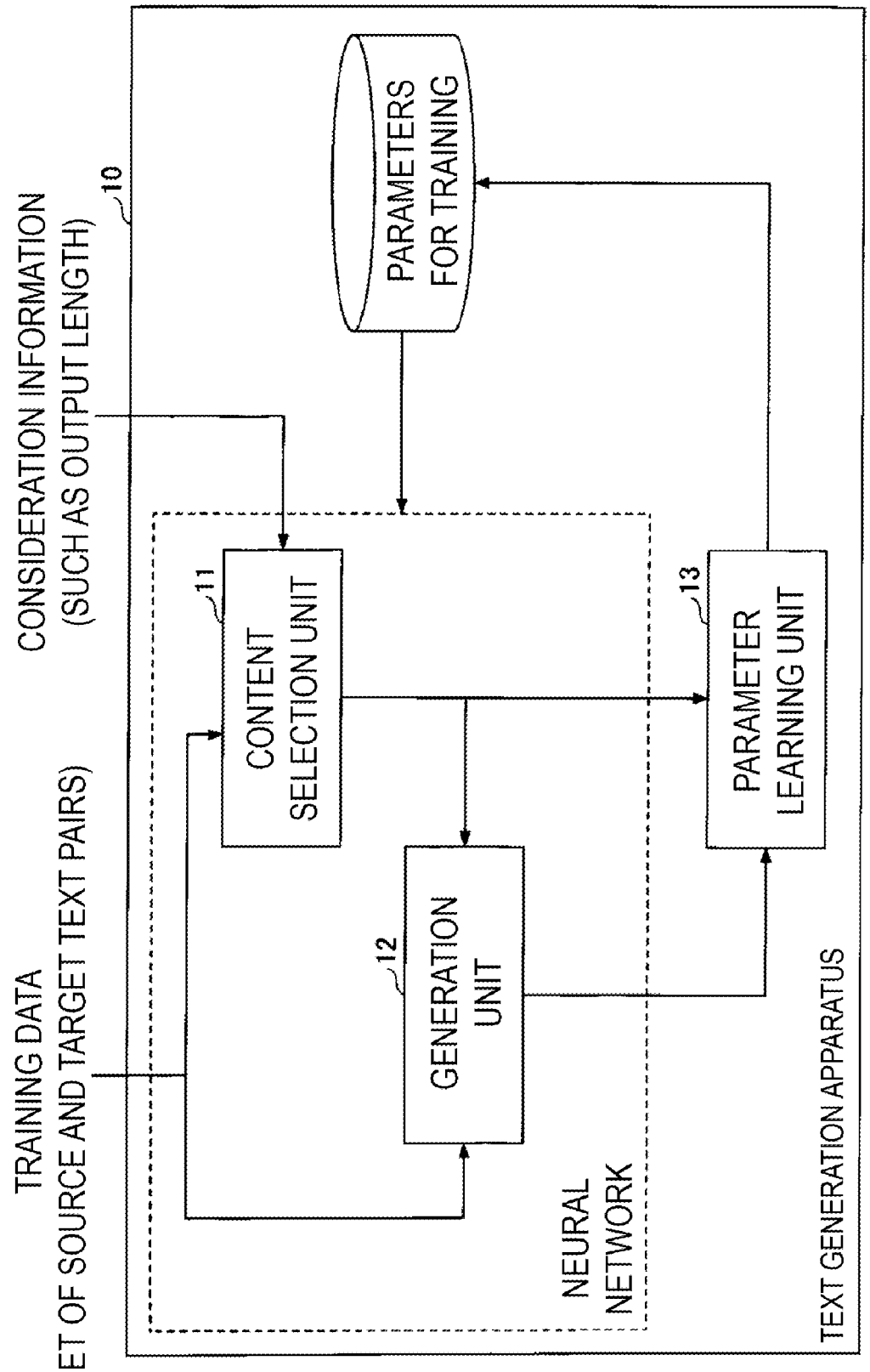
FIG. 7 is a diagram illustrating an exemplary functional configuration of the text generation apparatus 10 for learning according to the first embodiment.

Next, learning will be described. FIG. 7 is a diagram illustrating an exemplary functional configuration of the text generation apparatus 10 for learning according to the first embodiment. In FIG. 7, the same parts as those in FIG. 3 are denoted by the same reference signs and description thereof will be omitted.

The text generation apparatus 10 for learning further includes a parameter learning unit 13. The parameter learning unit 13 is implemented by a process of causing the CPU 104 to execute one or more programs installed in the text generation apparatus 10.

Training Data for Content Selection Unit 11

For example, pseudo-training data such as that of "Sebastian Gehrmann, Yuntian Deng, and Alexander Rush. 2018. Bottom-up abstractive summarization. In EMNLP, pages 4098-4109" (hereinafter referred to as "Reference 3") is used as training data. The training data includes pairs ($x^C_n$, $r_n$) of words $x^C_n$ and labels $r_n$ of the entire source text $x^C_n$. $r_n$ is 1 if $x^C_n$ is selected for a summary. To automatically create such pairs of data, first, an Oracle source sentence $S^{oracle}$ that maximizes the ROUGE-R score is extracted in the same way as in "Wan-Ting Hsu, Chieh-Kai Lin, Ming-Ying Lee, Kerui Min, Jing Tang, and Min Sun. 2018. A unified model for extractive and abstractive summarization using inconsistency loss. In ACL (1), pages 132-141." Then, a dynamic programming algorithm is used to calculate the word-by-word alignment between a reference summary and $S^{oracle}$. Finally, all aligned words are labeled 1 and the other words are labeled 0.

Training Data for Generation Unit 12

For learning of the generation unit 12, it is necessary to create 3-tuple data ($X^C$, $X^P$, Y) of a source text, a gold set of extracted words, and a target text (summary). Specifically, the content selection unit 11 is used to select an Oracle sentence $S^{oracle}$ and $p^{ext}_n$ is scored for all words $x^C_n$ of $S^{oracle}$. Next, top K words are selected according to $p^{ext}_n$. The original order of words is maintained at $X^P$. K is calculated using a reference summary length T. To obtain a natural summary that is close to a desired length, the reference summary length T is quantized into discrete size intervals. In the present embodiment, the size interval is set to 5.

Loss Function of Content Selection Unit 11

Because the process executed by the content selection unit 11 is a simple binary classification task, a binary cross-entropy loss is used.

[Math. 12]

$$L_{ext} = -\frac{1}{MN}\sum_{m=1}^{M}\sum_{n=1}^{N}\left(\begin{array}{c}r_n \log p_n^{ext} + \\ (1-r_n)\log(1-p_n^{ext})\end{array}\right)$$

where M is the number of training examples.
Loss Function of Generation Unit 12

A main loss for the generation unit 12 is a cross-entropy loss.

[Math. 13]

$$L_{gen}^{main} = -\frac{1}{MT}\sum_{m=1}^{M}\sum_{t=1}^{T}\log p(y_t \mid y_{1:t-1}, x)$$

Further, attention guide losses for the reference text encoding unit 122 and the decoding unit 123 are added. These attention guide losses are designed to guide an estimated attention distribution to a reference attention.

[Math. 14]

$$L_{attn}^{sum} = -\frac{1}{MTN}\sum_{m=1}^{M}\sum_{t=1}^{T}\sum_{n=1}^{N}r_{n(t)}\log p(a_t^{sum})$$

$$L_{attn}^{sal} = -\frac{1}{MKN}\sum_{m=1}^{M}\sum_{k=1}^{K}\sum_{n=1}^{N}r_{n(t)}\log p(a_l^{sal})$$

$p(a^{sum}_t)$ and $p(a^{sal}_t)$ are the top attention heads of the decoding unit 123 and the reference text encoding unit 122, respectively. n(t) indicates the absolute position in the source text corresponding to the t-th word in the summary word sequence.

The overall loss for the generation unit 12 is a linear combination of the above three losses.

[Math. 15]

$$L_{gen} = L_{gen}^{main} + \lambda_1 L_{attn}^{sum} + \lambda_2 L_{attn}^{sal}$$

$\lambda_1$ and $\lambda_2$ were set to 0.5 in an experiment which will be described below.

Then, the parameter learning unit 13 evaluates processing results of the content selection unit 11 and the generation unit 12 that are based on the training data described above by using the above loss function and updates training parameters of the content selection unit 11 and the generation unit 12 until the loss function converges. Values of the training parameters at which the loss function converges are used as learned parameters.

Experiment

An experiment performed according to the first embodiment will be described.

Dataset

The CNN-DM dataset ("Karl Moritz Hermann, Tomas Kocisky, Edward Grefenstette, Lasse Espeholt, Will Kay, Mustafa Suleyman, and Phil Blunsom. 2015. Teaching machines to read and comprehend. In Advances in Neural Information Processing Systems 28, pages 1693-1701" (hereinafter referred to as "Reference 4")) which is a standard corpus for news summaries was used. Summaries are bullets for articles displayed on websites. Following "Abigail See, Peter J. Liu, and Christopher D. Manning. 2017. Get to the point: Summarization with pointer-generator networks. In ACL (1), pages 1073-1083. (2017)," a non-anonymized version of the corpus was used, each source document was truncated into 400 tokens, and each target summary was truncated into 120 tokens. The dataset contains 286,817 training pairs, 13,368 validation pairs, and 11,487 test pairs. The Newsroom dataset was used to evaluate the domain transfer capability of the model ("Max Grusky, Mor Naaman, and Yoav Artzi. 2018. Newsroom: A dataset of 1.3 million summaries with diverse extractive strategies. In Proceedings of the 2018 Conference of the North American Chapter of the Association for Computational Linguistics: Human Language Technologies, Volume 1 (Long Papers), pages 708-719. Association for Computational Linguistics.").

While using the generation unit 12 learned on the CNN/DM dataset, the content selection unit 11 was learned on the Newsroom dataset (Reference 3). Newsroom contains a variety of news sources (38 different news sites). For learning of the content selection unit 11, 300,000 training pairs were sampled from all training data. The size of test pairs was 106,349.

Model Configuration

The same configuration was used for the two datasets. The content selection unit 11 used a pre-trained BERT Large model ("Jacob Devlin, Ming-Wei Chang, Kenton Lee, and Kristina Toutanova. 2018. Bert: Pre-training of deep bidirectional Transformers for language understanding. CoRR."). The BERT was fine-tuned for two epochs. Default settings were used for other parameters for fine-tuning. The content selection unit 11 and the generation unit 12 used pre-trained 300-dimensional GloVe embeddings. The model size $d_{model}$ of the Transformer was set to 512. The Transformer includes four Transformer blocks for the source text encoding unit 121, the reference text encoding unit 122, and the decoding unit 123. The number of heads was 8 and the number of dimensions of the feed forward network was 2048. The dropout rate was set to 0.2. An Adam optimizer with $\beta_1$=0.9, $\beta_2$=0.98, and $\varepsilon=e^{-9}$ ("Diederik P. Kingma and Jimmy Ba. 2015. Adam: A method for stochastic optimization. In International Conference on Learning Representations (ICLR)") was used for optimization. Following Reference 1, the learning rate was changed during training. The number of warm-up steps was set to 8,000. The size of the input vocabulary was set to 100,000 and the size of the output vocabulary was set to 1,000.

Experimental Results

Table 1 shows ROUGE scores of NPL 1 and the first embodiment.

TABLE 1

|                  | R-1   | R-2   | R-L   |
|------------------|-------|-------|-------|
| NPL 1            | 40.68 | 17.97 | 37.13 |
| FIRST EMBODIMENT | 41.41 | 19.00 | 38.01 |

According to Table 1, it can be seen that the first embodiment outperforms NPL 1 in all aspects of ROUGE-1 (R-1), ROUGE-2 (R-2), and ROUGE-L (R-L).

According to the first embodiment, information to be considered when generating text (the output length) can be added as text as described above. As a result, a source text (an input sentence) can be treated equivalently to features of the information to be considered.

In addition, the length is controlled using the length embedding in "Yuta Kikuchi, Graham Neubig, Ryohei Sasano, Hiroya Takamura, and Manabu Okumura. 2016. Controlling output length in neural encoder-decoders. In Proceedings of the 2016 Conference on Empirical Methods in Natural Language Processing, pages 1328-1338. Association for Computational Linguistics." In this method, the importance of a word according to the length cannot be explicitly taken into consideration and information to be included in an output sentence cannot be appropriately controlled in the control of the length. On the other hand, according to the present embodiment, it is possible to more directly generate a highly accurate summary while controlling important information according to the output length K without using the length embedding.

Next, a second embodiment will be described. The second embodiment will be described with respect to points different from the first embodiment. Points not particularly mentioned in the second embodiment may be the same as those in the first embodiment.

Figure 8:
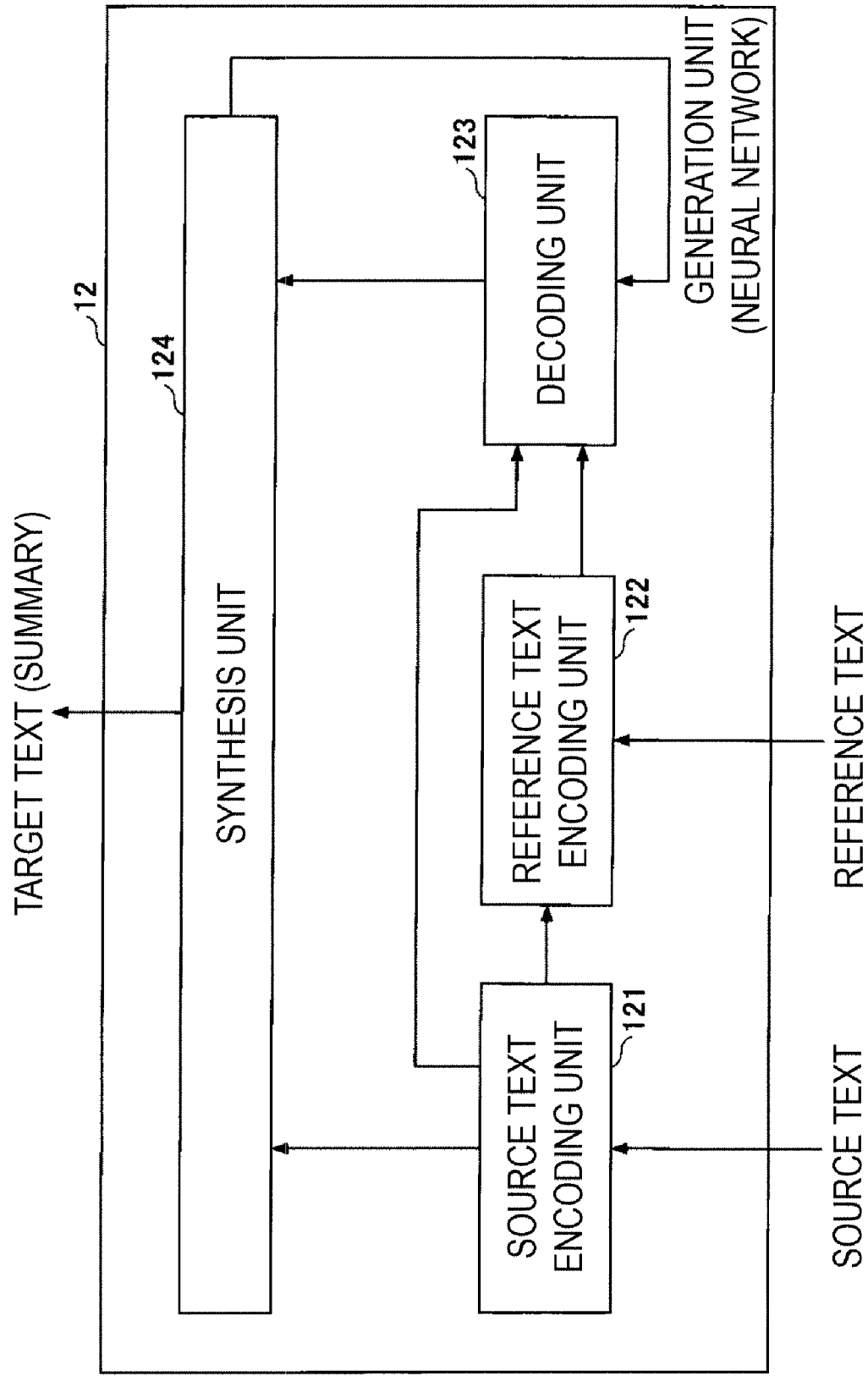
FIG. 8 is a diagram illustrating an exemplary configuration of a generation unit 12 in a second embodiment.

FIG. 8 is a diagram illustrating an exemplary configuration of the generation unit 12 in the second embodiment. In FIG. 8, the same parts as those in FIG. 3 are denoted by the same reference signs and description thereof will be omitted.

FIG. 8 differs from FIG. 3 in that the source text encoding unit 121 and the reference text encoding unit 122 cross-reference each other. This cross-reference is performed when source and reference texts are encoded.

The second embodiment differs in the configuration of the generation unit 12 as described above. Thus, the second embodiment also differs from the first embodiment in the procedure for generating a summary based on the reference text and the source text $X^C$ in step S103.

Figure 9:
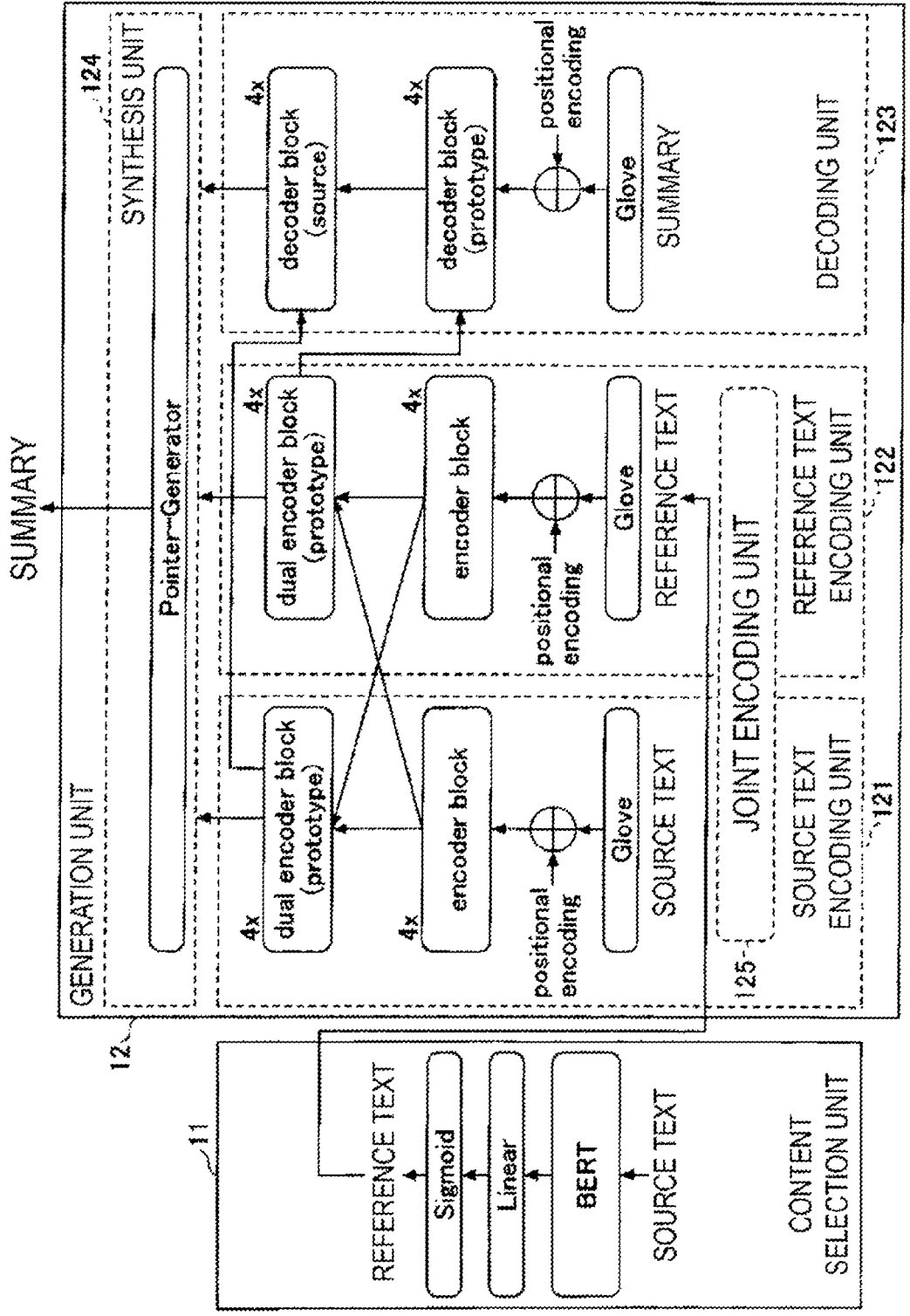
FIG. 9 is a diagram for explaining processing performed by the generation unit 12 in the second embodiment.

FIG. 9 is a diagram for explaining processing performed by the generation unit 12 in the second embodiment. In the second embodiment, the source text encoding unit 121 and the reference text encoding unit 122 are collectively referred to as a joint encoding unit 125 as illustrated in FIG. 9.

Joint Encoding Unit 125

First, an embedding layer of the joint encoding unit 125 projects one-hot vectors (of size V) of words $X^C_l$ onto a $d_{word}$-dimensional vector array using a pre-trained weight matrix

[Math. 16]

$$W^e \in \mathcal{R}^{d_{word} \times V}$$

such as that of Glove (Reference 2).

The embedding layer then uses a fully connected layer to map each $d_{word}$-dimensional word embedding to a $d_{model}$-dimensional vector and passes the mapped embedding to a ReLU function. The embedding layer also adds positional encoding to the word embedding (Reference 1).

Transformer encoder blocks of the joint encoding unit 125 encode the embedded source and reference texts as a stack of Transformer blocks. Each Transformer encoder block has the same architecture as that of Reference 1. The Transformer encoder block includes two subcomponents, a multi-head self-attention network and a fully connected feed forward network. Each network applies residual connections. In this model, both the source text and the reference text are individually encoded in the encoder stack. The encoding outputs of the source text and the reference text are represented respectively by

[Math. 17]

$$E_s^C \in \mathcal{R}^{d_{model} \times L} \text{ and } E_s^P \in \mathcal{R}^{d_{model} \times K}$$

Transformer dual encoder blocks in the joint encoding unit 125 calculate the interactive attention between the encoded source and reference texts. Specifically, the Transformer dual encoder blocks first encode the source and reference texts and then perform multi-head attention on the other outputs of the encoder stack (that is, $E^C_s$ and $E^P_s$). The outputs of the dual encoder stack of the source and reference texts are represented respectively by

[Math. 18]

$$M^C \in \mathcal{R}^{d_{model} \times L} \text{ and } M^P \in \mathcal{R}^{d_{model} \times K}$$

Decoding Unit 123

An embedding layer of the decoding unit 123 receives the word sequence of a summary Y generated through an autoregressive process. At each decoding step t, the decoding unit 123 projects one-hot vectors of words $y_t$ in the same way as the embedding layer of the joint encoding unit 125.

Each Transformer decoder block of the decoding unit 123 has the same architecture as that of Reference 1. This component is used stepwise during testing, such that a subsequent mask is used. The decoding unit 123 uses a stack of decoder blocks to perform multi-head attention on a representation $M^P$ obtained by encoding the reference text. The decoding unit 123 uses another stack of decoder blocks to perform multi-head attention on a representation $M^C$ obtained by encoding the source text, on top of the first stack. The first stack is to rewrite the reference text and the second is to complement the rewritten reference text with the original source information. The output of the stacks is

[Math. 19]

$$M^S \in \mathcal{R}^{d_{model} \times T}$$

Synthesis Unit 124

Using a pointer-generator, the synthesis unit 124 selects information from any of the source text, the reference text, and the decoding unit 123 based on copy distributions and generates a summary based on the selected information.

The copy distributions of the source text and the reference text are as follows.

[Math. 20]

$$p_P(y_t) = \sum_{k: x_k^P = y_t} \alpha_{tk}^P, \quad p_c(y_t) = \sum_{l: x_n^C = y_t} \alpha_{tn}^C$$

Where $\alpha^P_{tk}$ and $\alpha^C_{tn}$ are the first attention head of the last block of the first stack of the decoding unit 123 and the first attention head of the last block of the second stack of the decoding unit 123, respectively.

A final vocabulary distribution is as follows.

[Math. 21]

$$p(y_t) = \lambda_g p_g(y_t) + \lambda_c p_c(y_t) + \lambda_p p_p(y_t)$$

$$\lambda_g, \lambda_c, \lambda_p = \text{softmax}(W^\nu [M_t^S; c_t^C; c_t^P] + b^\nu)$$

$$c_t^C = \sum_l \alpha_{tn}^C M_n^C$$

$$c_t^P = \sum_k \alpha_{tk}^P M_k^P$$

$$p_g(y_t) = \text{softmax}(W^g(M_t^S) + b^g)$$

where $W^\nu \in R^{3 \times 3d_{model}}$, $b^\nu \in R^3$, $W^g \in R^3$, $W^g \in R^{d_{model} \times V}$ and $b^g \in R^V$ are learnable parameters.

Next, learning will be described. The parameter learning unit 13 functions during learning in the same way as in the first embodiment.

Training Data for Content Selection Unit 11 and Generation Unit 12

Training data for each of the content selection unit 11 and the generation unit 12 may be the same as in the first embodiment.

Loss Function of Content Selection Unit 11

Because the process executed by the content selection unit 11 is a simple binary classification task, a binary cross-entropy loss is used.

[Math. 22]

$$L_{ext} = -\frac{1}{MN} \sum_{m=1}^{M} \sum_{n=1}^{N} \binom{r_n \log p_n^{ext} +}{(1 - r_n) \log(2 - p_n^{ext})}$$

where M is the number of training examples.

Loss Function of Generation Unit 12

A main loss for the generation unit 12 is a cross-entropy loss.

[Math. 23]

$$L_{gen}^{main} = -\frac{1}{MT} \sum_{m=1}^{M} \sum_{t=1}^{T} \log p(y_t \mid y_{1:t-1}, X^C, X^P)$$

Further, attention guide losses for the decoding unit 123 are added. These attention guide losses are designed to guide an estimated attention distribution to a reference attention.

[Math. 24]

$$L_{attn}^{sum} = -\frac{1}{MT} \sum_{m=1}^{M} \sum_{t=1}^{T} \log \alpha_{tn,n(t)}^C$$

$$L_{attn}^{proto} = -\frac{1}{MT} \sum_{m=1}^{M} \sum_{t=1}^{T} \log \alpha_{t,n(t)}^{proto}$$

$\alpha^{proto}_{t,n(t)}$ is the first attention head of the last block of the joint encoder stack for the reference text. n(t) indicates the absolute position in the source text corresponding to the t-th word in the summary word sequence.

The overall loss for the generation unit 12 is a linear combination of the above three losses.

[Math. 25]

$$L_{gen} = L_{gen}^{main} + \lambda_1 L_{attn}^{sum} + \lambda_2 L_{attn}^{proto}$$

$\lambda_1$ and $\lambda_2$ were set to 0.5 in an experiment which will be described below.

Then, the parameter learning unit 13 evaluates processing results of the content selection unit 11 and the generation unit 12 that are based on the training data described above by using the above loss function and updates training parameters of the content selection unit 11 and the generation unit 12 until the loss function converges. Values of the training parameters at which the loss function converges are used as learned parameters.

Experiment

An experiment performed according to the second embodiment will be described. Datasets used in the experiment of the second embodiment were the same as those of the first embodiment.

Experimental Results

Table 2 shows ROUGE scores of NPL 1 and the second embodiment.

TABLE 2

|  | R-1 | R-2 | R-L |
| --- | --- | --- | --- |
| NPL 1 | 40.68 | 17.97 | 37.13 |
| SECOND EMBODIMENT | 42.38 | 19.97 | 39.16 |

According to Table 2, it can be seen that the second embodiment outperforms NPL 1 in all aspects of ROUGE-1 (R-1), ROUGE-2 (R-2), and ROUGE-L (R-L).

According to the second embodiment, the same advantages as those of the first embodiment can be achieved as described above.

Further, according to the second embodiment, words included in a reference text can also be used to generate a summary.

Next, a third embodiment will be described. The third embodiment will be described with respect to points different from the first embodiment. Points not particularly mentioned in the third embodiment may be the same as those in the first embodiment.

The third embodiment will be described with respect to an example in which summarization in consideration of external knowledge is possible and important information in an input sentence can be directly controlled according to the external knowledge. Here, the third embodiment can achieve these features by retrieving information similar to a source text from a knowledge source database (DB) 20 that stores external knowledge which is a text format document (a set of sentences) and using K sentences in the retrieved information which have high relevance to the source text and a relevance measure indicating the degree of relevance as a reference text.

Figure 10:
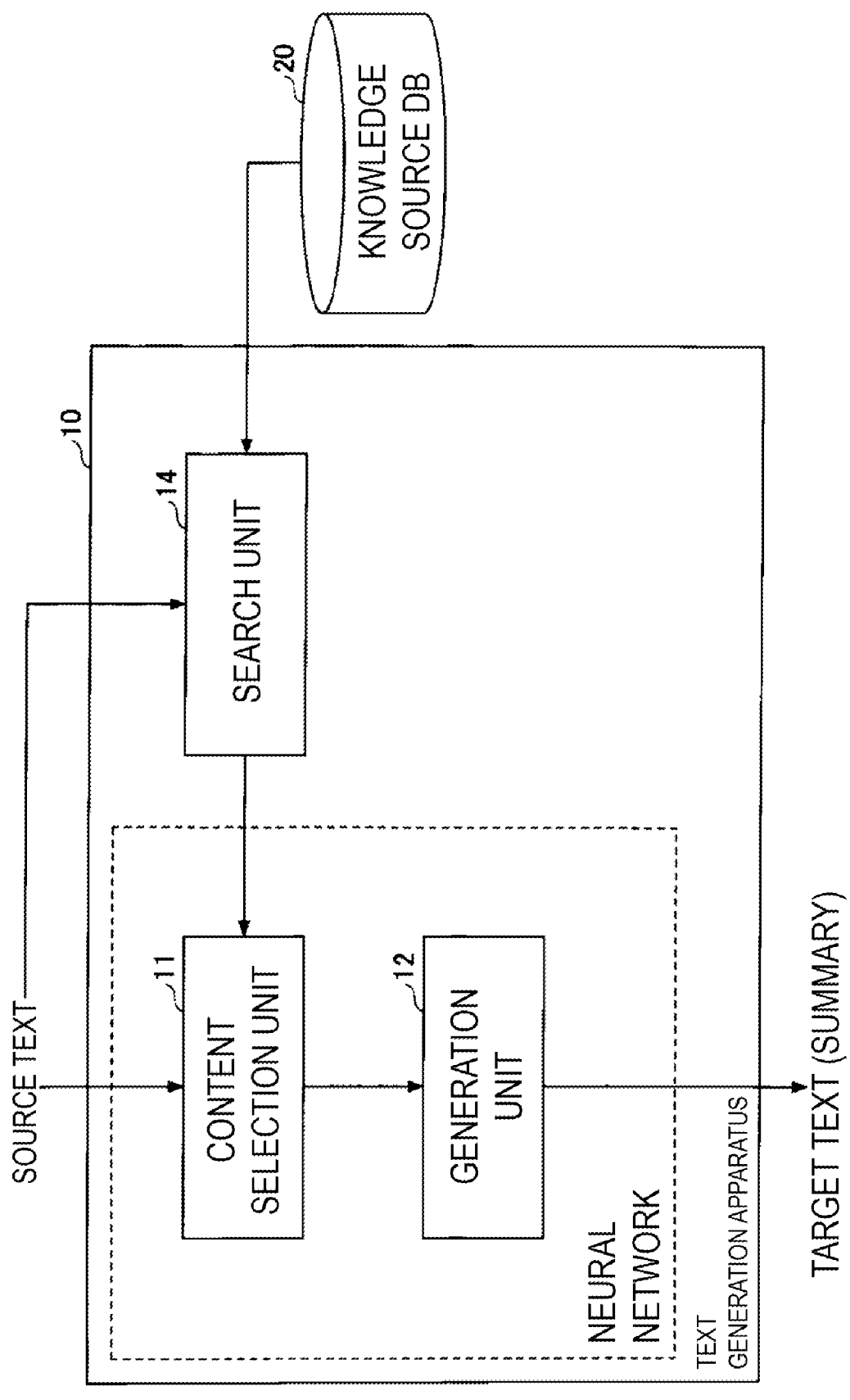
FIG. 10 is a diagram illustrating an exemplary functional configuration of a text generation apparatus 10 according to a third embodiment.

FIG. 10 is a diagram illustrating an exemplary functional configuration of the text generation apparatus 10 according to the third embodiment. In FIG. 10, the same or corresponding parts as those in FIG. 2 are denoted by the same reference signs and description thereof will be omitted as appropriate.

In FIG. 10, the text generation apparatus 10 further includes a search unit 14. The search unit 14 retrieves information from the knowledge source database 20 using the source text as a query. The information retrieved by the search unit 14 corresponds to consideration information in each of the above embodiments. That is, in the third embodiment, consideration information is external knowledge (a reference text created from external knowledge based on the relevance to a source text).

Figure 11:
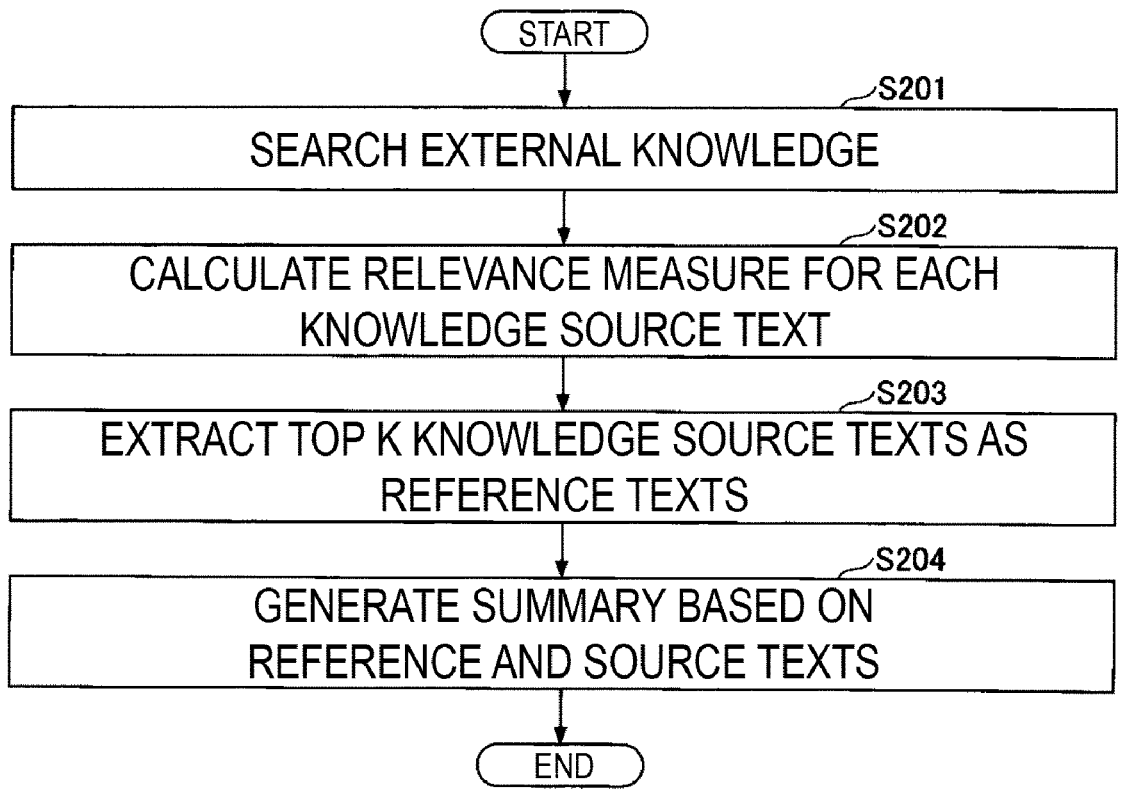
FIG. 11 is a flowchart for explaining an example of a processing procedure executed by the text generation apparatus 10 according to the third embodiment.

FIG. 11 is a flowchart for explaining an example of a processing procedure executed by the text generation apparatus 10 according to the third embodiment.

In step S201, the search unit 14 searches the knowledge source database 20 using a source text as a query.

FIG. 12 is a diagram illustrating an exemplary configuration of the knowledge source database 20. FIG. 12 illustrates examples (1) and (2).

(1) illustrates an example in which pairs of documents, each pair of documents serving as input and output sentences of a task executed by the text generation apparatus 10, are stored in the knowledge source database 20. FIG. 12(1) illustrates an example in which pairs of news articles and headlines (or summaries) are stored as an example of the case where the task is generation of a title or a summary.

(2) illustrates an example in which documents at one side of the pairs (only headlines in the example of FIG. 12) are stored in the knowledge source database 20.

In any case, it is assumed that a large amount of knowledge (information) is stored in the knowledge source database 20.

In step S201, the search unit 14 searches the knowledge source database 20 for a group of documents, the number of which is a re-rankable number K' (about 30 to 1000) which will be described later, using a high-speed search module such as Elasticsearch.

When the knowledge source database 20 is configured as illustrated in (1), any of the search methods, search based on the similarity between the source text and headlines, search based on the similarity between the source text and news articles, or search based on the similarity between the source text and news articles+headlines, can be considered.

On the other hand, when the knowledge source database 20 is configured as illustrated in (2), search based on the similarity between the source text and headlines can be considered. The similarity is a known index for evaluating the similarity between documents such as the number of same words included or the cosine similarity.

In the present embodiment, in any of the cases (1) and (2), it is assumed that K' headlines are obtained as search results based on the similarity and the headlines are each a sentence. Hereinafter, K' sentences (headlines) which are the search results are each referred to as a "knowledge source text."

Subsequently, for each knowledge source text, the content selection unit 11 calculates a sentence-level relevance measure (a relevance measure of each knowledge source text) using a relevance measure calculation model which is a pre-trained neural network (S202). The relevance measure calculation model may form a part of the content selection unit 11. The relevance measure is an index indicating the degree of relevance, similarity, or correlation with the source text and corresponds to the importance in the first or second embodiment.

Figure 13:
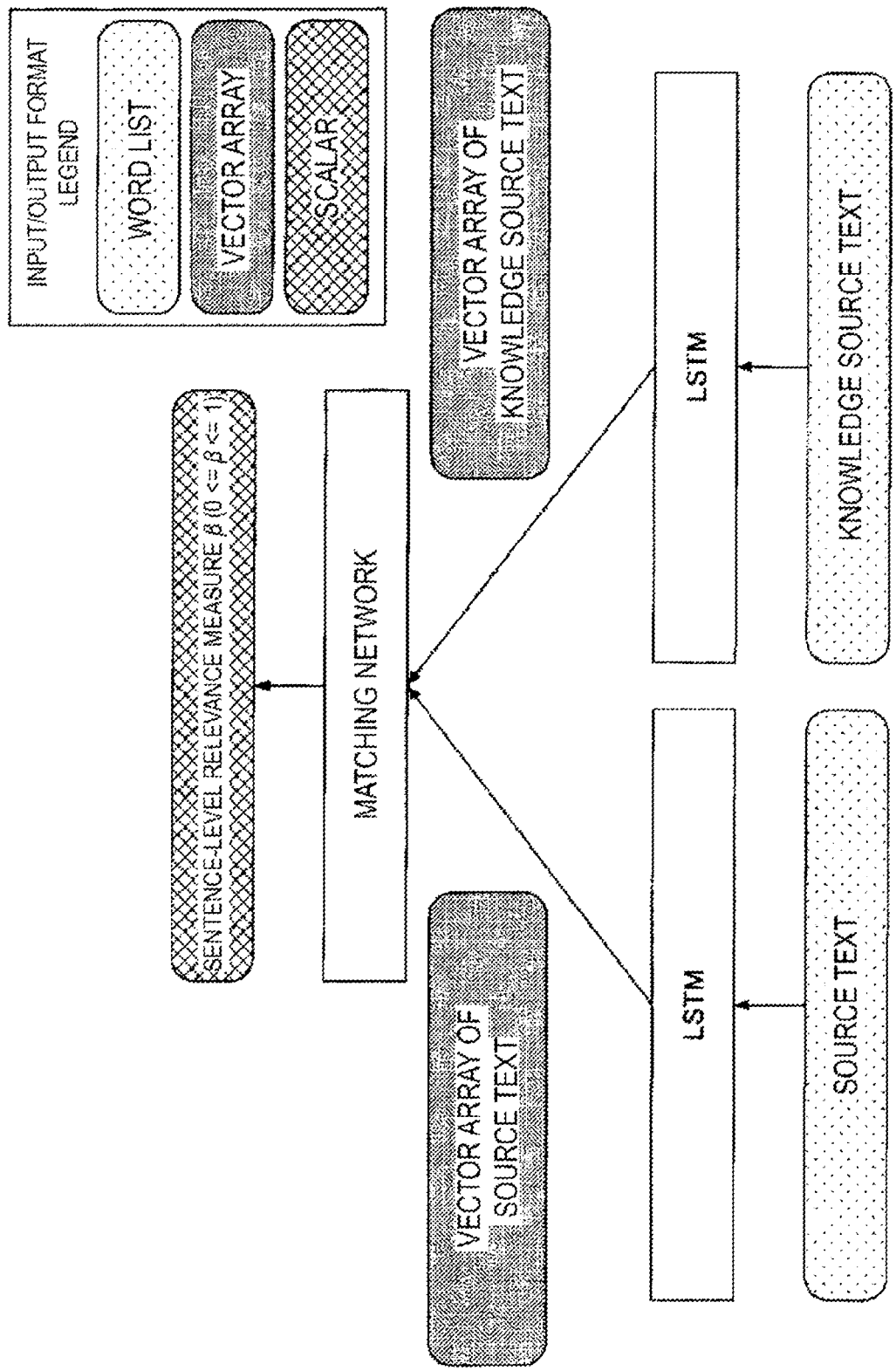
FIG. 13 is a diagram for explaining a first example of a relevance measure calculation model.

FIG. 13 is a diagram for explaining a first example of the relevance measure calculation model. A source text and a knowledge source text are input to respective LSTMs as illustrated in FIG. 13. Each LSTM transforms each word included in the corresponding text into a vector of a predetermined dimension. As a result, each text becomes an array of vectors of the predetermined dimension. The number of vectors (that is, the length of the vector array) I is determined based on the number of words. For example, I is set to 300 or the like, and when the number of words is less than 300, predetermined words such as "PAD" are used to make the number of words equal to 300. Here, for convenience, it is assumed that the number of words is equal to the number of vectors. Thus, it is assumed that the length of a vector array which is the result of conversion of a text including I words is I.

A matching network takes the vector array of the source text and the vector array of the knowledge source text as inputs and calculates a sentence-level relevance measure $\beta$ ($0 \leq \beta \leq 1$) for the knowledge source text. For example, a co-attention network ("Caiming Xiong, Victor Zhong, Richard Socher, DYNAMIC COATTENTION NETWORKS FOR QUESTION ANSWERING, Published as a conference paper at ICLR 2017") may be used as the matching network.

Figure 14:
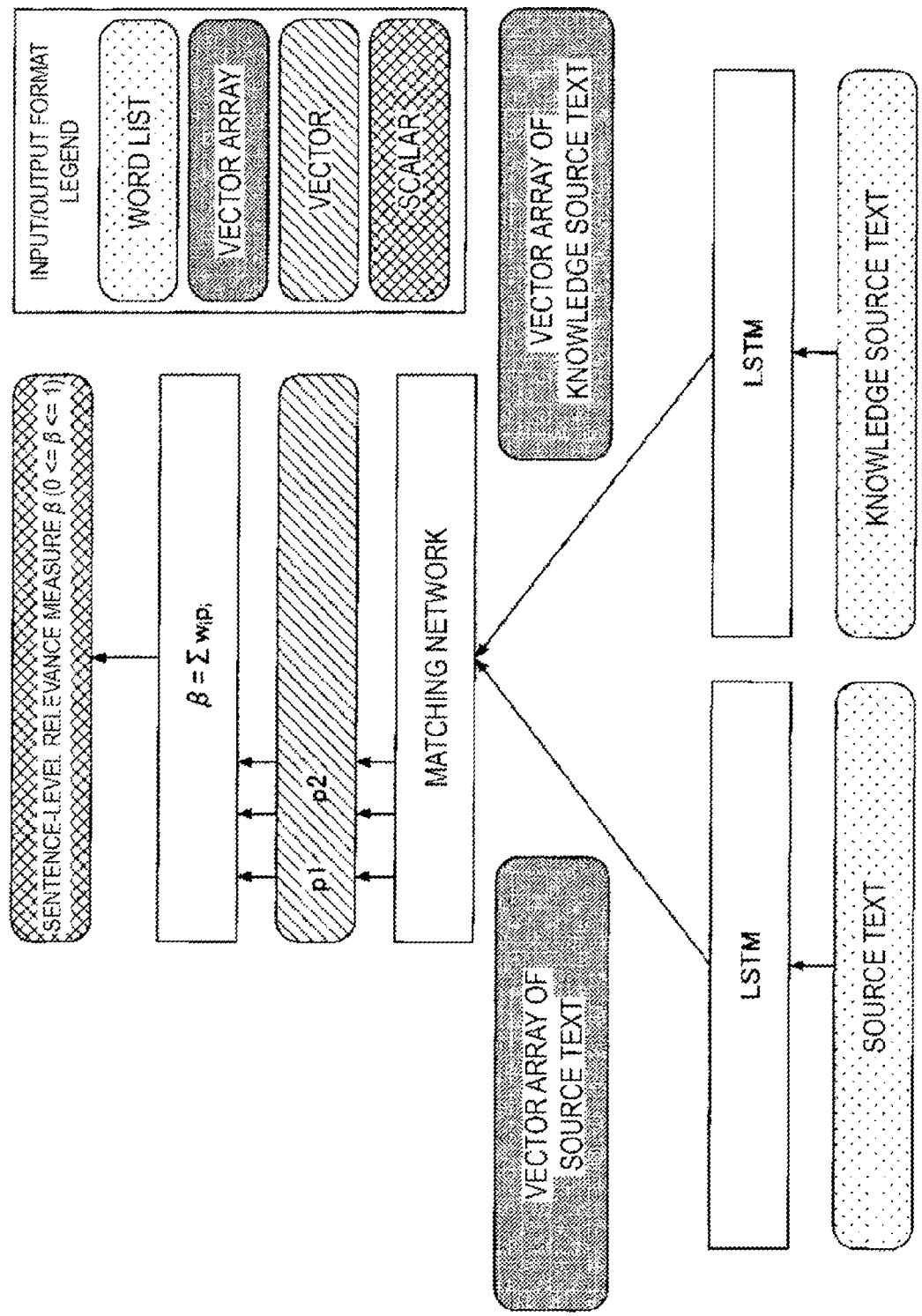
FIG. 14 is a diagram for explaining a second example of a relevance measure calculation model.

FIG. 14 is a diagram for explaining a second example of the relevance measure calculation model. FIG. 14 will be described with respect to only points different from FIG. 13.

FIG. 14 differs in that the matching network calculates a word-level relevance measure $p_i$ ($0 \leq p_i \leq 1$) for each word i included in the knowledge source text (that is, for each element of the vector array). Such a matching network may also be realized using a co-attention network.

The relevance measure calculation model calculates the sentence-level relevance measure $\beta$ by a weighted sum of word-level relevance measures $p_i$. Thus, $\beta = \Sigma w_i p_i$ (where i=1, . . . , number of words). $w_i$ is a learnable parameter of the neural network.

The process described with reference to FIG. 13 or 14 is performed on K' knowledge source texts. Thus, the relevance measure $\beta$ is calculated for each knowledge source text.

Subsequently, the content selection unit 11 extracts, as a reference text, the result of concatenating a predetermined number (K) of two or more knowledge source texts in descending order of the relevance measure $\beta$ calculated using the method as illustrated in FIG. 13 or 14 (S203).

Subsequently, the generation unit 12 generates a summary based on the reference text and the source text (S204). Details of processing executed by the generation unit 12 may be basically the same as those of the first or second embodiment. However, the probability $\alpha^P_{tk}$ of attention to each word of the reference text may be weighted as follows using the word-level relevance measure or the sentence-level relevance measure. In the above description, the variable $\alpha^P_{tk}$ is defined as an attention head. However, because reference is made to the value of $\alpha^P_{tk}$ here, $\alpha^P_{tk}$ corresponds to the attention probability. In the following, the sentence-level relevance measure or the word-level relevance measure will be represented by $\beta$ for convenience. Either the word-level relevance measure or the sentence-level relevance measure may be used or both may be used.

When the sentence-level relevance measure is used, the attention probability $\alpha^P_{tk}$ is updated, for example, as follows.

[Math. 26]

$$\hat{\alpha}^P_{tk} = \frac{\alpha^P_{tk} \times \beta_{S(k)}}{\sum_k \alpha^P_{tk} \times \beta_{S(k)}}$$

The left side is the attention probability after the update. $\beta_S(k)$ is the relevance measure $\beta$ of a sentence S including a word k.

When the word-level relevance measure is used, the word-level relevance measure $p_i$ corresponding to the word k is applied to $\beta_S(k)$ in the above equation. When both are used, it is conceivable, for example, to weight the word-level relevance measure by the sentence-level relevance measure as in the above equation (2). $p_i$ is calculated for each sentence S. $p_i$ plays the same role as the importance (of equation (1)) in the first embodiment. Further, k is a word number assigned to each word in the reference text (the set of extracted sentences S).

Figure 15:
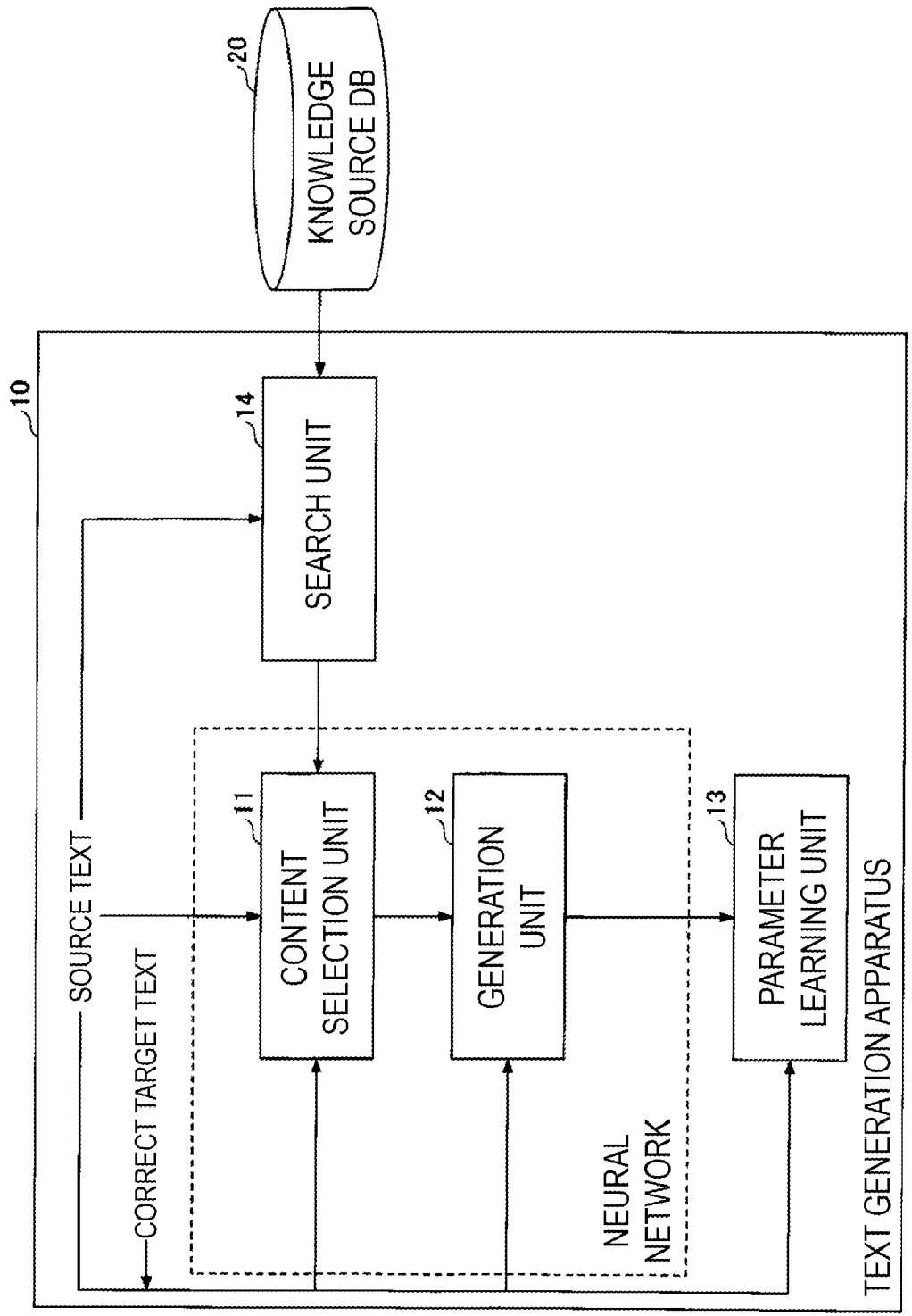
FIG. 15 is a diagram illustrating an exemplary functional configuration of a text generation apparatus 10 for training according to a third embodiment.

Next, learning will be described. FIG. 15 is a diagram illustrating an exemplary functional configuration of the text generation apparatus 10 for learning according to the third embodiment. In FIG. 15, the same or corresponding parts as those in FIG. 7 or 10 are denoted by the same reference signs and description thereof will be omitted as appropriate.

In the third embodiment, learning of the content selection unit 11 and the generation unit 12 may be basically the same as in each of the above embodiments. Here, two methods for learning the relevance measure calculation model used in the third embodiment will be described.

The first is a method of defining correct information of a sentence-level relevance measure $\beta$ from a calculation result of the relevance measure $\beta$ and a correct target text by using a score such as a Rouge score.

The second is a method of determining correct information of a word-level relevance measure as 1 or 0 indicating whether or not a correct sentence (for example, a target text such as a summary) includes a corresponding word.

Although an example in which the text generation apparatus 10 includes the search unit 14 has been described above, all knowledge source texts included in external knowledge included in the knowledge source database 20 may be input to the content selection unit 11 when the external knowledge has been narrowed down in advance. In this case, the text generation apparatus 10 does not have to include the search unit 14.

According to the third embodiment, a summary including words that are not in a source text can be efficiently generated using external knowledge as described above. The words are those included in knowledge source texts which are each text as the name indicates. Thus, according to the third embodiment, information to be considered when generating text can be added as text.

In a technology disclosed in "Ziqiang Cao, Wenjie Li, Sujian Li, and FuruWei. 2018. Retrieve, rerank and rewrite: Soft template based neural summarization. In Proceedings of the 56th Annual Meeting of the Association for Computational Linguistics (Volume 1: Long Papers), pages 152-161. Association for Computational Linguistics," (1) words included in external knowledge cannot be used for text generation as they are, although a target text can be generated taking into consideration external knowledge. In addition, in this technology, (2) the importance of each content of external knowledge cannot be taken into consideration. On the other hand, in the third embodiment, (1) sentence-level and word-level relevance measures of external knowledge can be taken into consideration and (2) important parts in external knowledge can be included in an output sentence using CopyNetwork (the synthesis unit 124).

Although the above embodiments have been described with respect to a summary generation task as an example, each of the above embodiments may be applied to various other text generation tasks.

In each of the above embodiments, the text generation apparatus 10 for learning is an example of a text generation learning apparatus.

Although embodiments of the present invention have been described in detail above, the present invention is not limited to such specific embodiments and various modifications and changes can be made within the scope of the spirit of the present invention described in the claims.

REFERENCE SIGNS LIST

10 Text generation apparatus
11 Content selection unit
12 Generation unit
13 Parameter learning unit
14 Search unit
20 Knowledge source database
100 Drive device
101 Recording medium
102 Auxiliary storage device
103 Memory device
104 CPU
105 Interface device
121 Source text encoding unit
122 Reference text encoding unit
123 Decoding unit
124 Synthetic unit
125 Joint encoding unit
B Bus

The invention claimed is:

1. A text generation apparatus comprising:
a memory; and
a processor configured to execute:
  receive an input sentence from a source, wherein the input sentence is in textual form;
  acquire a reference text in textual form as extracted from an externally connected knowledge source database according to first learned parameters of a first trained neural network, wherein the externally connected knowledge source database is distinct from the source, the reference text includes a predetermined number of two or more sentences in textual form, respective sentences in the reference text are distinct from the input sentence, and the first trained neural network generates a relevance score associated with a respective sentence of the reference text based on vectorized words associated with the input sentence, and the relevance score indicates semantic relevance between a respective sentence of the externally connected knowledge source database and the input sentence;
  identify, based on the relevance score, one or more reference sentences of the reference text predicted as relevant to the input sentence;
  identify, based on another relevance score, one or more parts of the input sentence for summarization; and generate, using the identified one or more reference sentences predicted as relevant to the identified one or more parts of the input sentence, an output sentence that is a summary of the input sentence according to second learned parameters of a second trained neural network, wherein the second trained neural network generates the output sentence by summarizing a combination including the identified one or more parts of the input sentence and the identified one or more reference sentences using vectorized words associated with the input sentence, and the output sentence as a summary of the input sentence comprises a word at least in part obtained from one or more words of the identified one or more parts of the input sentence and another word at least in part obtained from at least a part of the identified one or more reference sentences.

2. The text generation apparatus according to claim 1, wherein the processor is configured to calculate a relevance measure indicating a degree of the relevance for each sentence included in the set or for each word of the sentence and select a sentence to be included in the reference text based on the relevance measure.

3. The text generation apparatus according to claim 2, wherein the processor is configured to, when generating text based on the reference text, weight an attention probability for each word included in the reference text by using the relevance measure.

4. A text generation learning apparatus comprising:
a memory; and
a processor configured to, based on learned parameters of neural networks:
receive an input sentence from a source, wherein the input sentence is in text form;
acquire a reference text in textual form from as extracted an externally connected knowledge source database according to first learned parameters of a first trained neural network,
   wherein the externally connected knowledge source database is distinct from the source,
   the reference text includes a predetermined number of two or more sentences in textual form, respective sentences in the reference text are distinct from the input sentence, and
   the first trained neural network generates a relevance score associated with a respective sentence of the reference text based on vectorized words associated with the input sentence, and the relevance score indicates semantic relevance between a respective sentence of the externally connected knowledge source database and the input sentence;
identify, based on the relevance score, one or more reference sentences of the reference text predicted as relevant to the input sentence;
identify, based on another relevance score, one or more parts of the input sentence for summarization; and
generate, using the identified one or more reference sentences predicted as relevant to the identified one or more parts of the input sentence, an output sentence that is a summary of the input sentence according to second learned parameters of a second trained neural network, wherein the second trained neural network generates the output sentence by summarizing a combination including the identified one or more parts of the input sentence and the identified one or more reference sentences using vectorized words associated with the input sentence, the output sentence as a summary of the input sentence comprises a word at least in part obtained from one or more words of the identified one or more parts of the input sentence and another word at least in part obtained from at least a part of the identified one or more reference sentences, and
wherein the processor is further configured to learn the parameters.

5. A computer-implemented text generation method, performed based on learned parameters of neural networks comprising operations to:
receive an input sentence from a source, wherein the input sentence is in textual form;
acquire a reference text in textual form as extracted from an externally connected knowledge source database according to first learned parameters of a first trained neural network, wherein the externally connected knowledge source database is distinct from the source, the reference text includes a predetermined number of two or more sentences in textual form, respective sentences in the reference text are distinct from an input sentence, and the first trained neural network generates a relevance score associated with a respective sentence of the reference text based on vectorized words associated with the input sentence, and the relevance score indicates semantic relevance between a respective sentence of the externally connected knowledge source database and the input sentence;
identify, based on the relevance score, one or more reference sentences of the reference text predicted as relevant to the input sentence;
identify, based on another relevance score, one or more parts of the input sentence for summarization; and
generate, using the identified one or more reference sentences predicted as relevant to the input sentence, based on the identified one or more parts of the input sentence and the reference text, an output sentence that is a summary of the input sentence according to second learned parameters of a second trained neural network, wherein the second trained neural network generates the output sentence by summarizing a combination including the identified one or more parts of the input sentence and the identified one or more reference sentences using vectorized words associated with the input sentence, and the output sentence as a summary of the input sentence comprises a word at least in part obtained from one or more words of the identified one or more parts of the input sentence and another word at least in part obtained from at least a part of the identified one or more reference sentences.

6. A non-transitory computer-readable recording medium having a program stored thereon causing a computer to execute the text generation method of claim 5.

* * * * *